US011833592B2

(12) United States Patent
Russell et al.

(10) Patent No.: US 11,833,592 B2
(45) Date of Patent: Dec. 5, 2023

(54) DRILL SYSTEM, AN UPPER DRILL TOOL AND A LOWER DRILL TOOL FOR PRECISION FORMING OF OPENINGS IN A BRACKET, AND METHODS OF USE

(71) Applicant: JR Automation Technologies, LLC, Holland, MI (US)

(72) Inventors: Joseph Robert Russell, Jenison, MI (US); Jason R. Turman, Grand Haven, MI (US); Ryan Nathan Anderson, Dayton, OH (US); Marcos Merino, Grand Rapids, MI (US); Gabriel C. Van't Land, Holland, MI (US)

(73) Assignee: JR Automation Technologies, LLC, Holland, MI (US)

( * ) Notice: Subject to any disclaimer, the term of this patent is extended or adjusted under 35 U.S.C. 154(b) by 276 days.

(21) Appl. No.: 17/169,908

(22) Filed: Feb. 8, 2021

(65) Prior Publication Data

US 2021/0245265 A1    Aug. 12, 2021

Related U.S. Application Data

(60) Provisional application No. 63/031,882, filed on May 29, 2020, provisional application No. 62/971,929, filed on Feb. 8, 2020.

(51) Int. Cl.
*B23B 31/02* (2006.01)
*B23B 39/16* (2006.01)
(Continued)

(52) U.S. Cl.
CPC .............. *B23B 31/028* (2013.01); *B21J 15/14* (2013.01); *B23B 31/1075* (2013.01);
(Continued)

(58) Field of Classification Search
CPC ..... B23B 31/028; B23B 39/161; B23B 47/28; B23Q 17/006; B23Q 17/2216; B23Q 3/183

See application file for complete search history.

(56) References Cited

U.S. PATENT DOCUMENTS

| 5,458,443 A | * | 10/1995 | Belge ................... B23Q 1/4866 408/67 |
| 9,610,668 B2 | * | 4/2017 | Chen ..................... B23Q 39/023 |
| 2022/0024000 A1 | * | 1/2022 | Yoshimi ................... B25B 5/16 |

FOREIGN PATENT DOCUMENTS

| CN | 104439425 A | 3/2015 |
| CN | 205614087 U | * 10/2016 |

(Continued)

*Primary Examiner* — Eric A. Gates
*Assistant Examiner* — Reinaldo A Del Vargas Rio
(74) *Attorney, Agent, or Firm* — The Watson IP Group, PLC; Jovan N. Jovanovic (57) ABSTRACT

An upper drill tool including a central chuck, an upper component, a lower component and a coupling assembly. The central chuck has a chuck base and a chuck structurally configured to retain a drill bit. The upper component is attached to the central chuck and has a lower stop surface. The lower component has a central body and an outer ring that threadedly engages the central body, with the outer ring having an upper stop. The coupling assembly is configured to facilitate the slidable movement of the lower component from a first orientation wherein the upper stop is spaced apart from the lower stop surface and a second orientation wherein the upper stop is in abutting engagement with the lower stop surface, with the first orientation and the second orientation defining a stroke.

19 Claims, 11 Drawing Sheets

(51) Int. Cl.
  *B23Q 17/00* (2006.01)
  *B23Q 17/22* (2006.01)
  *B23B 31/107* (2006.01)
  *B23B 51/10* (2006.01)
  *B23Q 3/18* (2006.01)
  *B21J 15/14* (2006.01)
  *B23P 23/04* (2006.01)
  *B21J 15/02* (2006.01)
  *B21J 15/30* (2006.01)
  *B21J 15/32* (2006.01)
  *B23B 35/00* (2006.01)
  *B23Q 15/007* (2006.01)
  *B23Q 16/00* (2006.01)

(52) U.S. Cl.
  CPC .......... *B23B 39/161* (2013.01); *B23B 51/107* (2013.01); *B23P 23/04* (2013.01); *B23Q 3/18* (2013.01); *B23Q 3/183* (2013.01); *B23Q 17/006* (2013.01); *B23Q 17/2216* (2013.01); *B21J 15/02* (2013.01); *B21J 15/30* (2013.01); *B21J 15/32* (2013.01); *B23B 35/00* (2013.01); *B23Q 15/0075* (2013.01); *B23Q 16/00* (2013.01)

(56) References Cited

FOREIGN PATENT DOCUMENTS

| | | | |
|---|---|---|---|
| CN | 205614087 U | 10/2016 | |
| CN | 110238423 A * | 9/2019 | |
| KR | 101456996 B1 * | 11/2014 | |
| KR | 101782377 B1 * | 9/2017 | |
| RU | 2120833 C1 | 10/1998 | |
| SU | 876325 A | 10/1981 | |
| SU | 1404194 A1 | 6/1988 | |
| WO | WO-9937439 A1 * | 7/1999 | ........... B23B 31/261 |

* cited by examiner

DRILL SYSTEM, AN UPPER DRILL TOOL AND A LOWER DRILL TOOL FOR PRECISION FORMING OF OPENINGS IN A BRACKET, AND METHODS OF USE

CROSS-REFERENCE TO RELATED APPLICATION

This application claims priority from U.S. Provisional Patent Application Ser. No. 62/971,929 filed on Feb. 8, 2020, entitled "SYSTEM AND METHOD FOR COUPLING FASTENER HARDWARE TO A BRACKET", and claims priority from U.S. Provisional Patent Application Ser. No. 63/031,882 filed on May 29, 2020, entitled "SYSTEM AND METHOD FOR COUPLING FASTENER HARDWARE TO A BRACKET", the entire disclosure of which is hereby incorporated by reference in its entirety.

BACKGROUND OF THE DISCLOSURE

1. Field of the Disclosure

The disclosure relates in general to a drill assembly, and more particularly, to a drill system that is utilized to make highly dimensionally precise openings in a bracket or other material, including an upper drill tool, a lower drill tool and a method of adjusting the drill tool as well as using the drill tool.

2. Background Art

In many applications it may be necessary to join components together through a riveting operation. In one particular field of assembly, fastener hardware (including, but not limited to fastener hardware that is sometimes referred to as a nutplate) are utilized to join components. In such configurations, fastener hardware is riveted to brackets and then structures are attached to the fastener hardware.

The formation of rivet openings in brackets and the riveting of fastener hardware is often a labor intensive process. Additionally, for many assemblies, multiple quantities of fastener hardware are mounted to a single bracket and the process is repeated many times to make the overall assembly.

Problematically, it is often difficult to quickly and expeditiously form the openings for the rivets and to economically apply the rivets. In may applications it is necessary to provide openings with high dimensional precision. One such area is with the application of fastener hardware to brackets that are utilized in the aviation industry (as components of aircraft and the like). In such applications, the formation of openings through which rivets are applied are made with high precision. For example, each such opening often requires a chamfer or countersink that must be highly precise in its depth and angle. Where a bracket requires multiple openings, a single incorrect opening (i.e., an opening that is not within the tight specifications) can render the entire larger bracket as scrap and unusable.

SUMMARY OF THE DISCLOSURE

The disclosure, in a first aspect, is directed to an upper drill tool comprising a central chuck, an upper component, a lower component and a coupling assembly. The upper chuck has a chuck base and at least one chuck. The at least one chuck is structurally configured to retain a drill bit. The upper component is coupled to the central chuck. The upper component has a lower stop surface. The lower component has a central body and an outer ring. The central body has an outer surface. The outer surface has threads disposed thereon. The central body further has a drill bit bore corresponding to each of the at least one chuck, to facilitate the passage of the drill bit therethrough. The bore terminates at a lower end of the central body. The outer ring has an inner surface which has outer ring threads positioned thereon. The outer ring threads matingly engage the threads of the central body. The outer ring has an upper stop interfaceable with the lower stop surface of the upper component. The coupling assembly has a slidable coupling having a first end attached to the lower component and a second end attached to one of the central chuck and the upper component. The slidable coupling facilitates the slidable movement of the lower component from a first orientation wherein the upper stop is spaced apart from the lower stop surface and a second orientation wherein the upper stop is in abutting engagement with the lower stop surface. The first orientation and the second orientation defining a stroke.

In some configurations, rotation of the outer ring relative to the central body along the outer ring threads and the threads in a first direction increases the stroke. Similarly, rotation of the outer ring relative to the central body in a second direction decreases the stroke.

In some configurations, the coupling assembly precludes rotation of the central body relative to the chuck base.

In some configurations, the coupling assembly further comprises a biasing member directing the lower component toward the first orientation.

In some configurations, the at least one chuck comprises at least two chucks in a side by side spaced apart orientation. Each of the chucks configured to retain a drill bit that is extendable through corresponding bores in the central body of the lower component.

In some configurations, the outer ring has an outer surface with a plurality of gripping members configured to facilitate grasping and rotation by a user.

In some configurations, the outer surface of the central body includes a plurality of vertical channels that are spaced apart from each other uniformly about the outer surface. At least one locking tab extends from an inner surface of the outer ring, biased against the outer surface so as to engage at least one of the plurality of vertical channels.

In some configurations, the rotation of the lower component sufficient so as to have a locking tab move between two adjacent vertical channels alters the stroke a predetermined quantity. In some configurations, the predetermined quantity of the altering of the stroke comprises one thousandth of an inch.

In some configurations, the outer ring surrounds the central body proximate the upper end thereof.

In some configurations, the central body further includes a side slot extending to the at least one bore proximate the lower end of the central body so as to provide ingress for lubricant.

In some configurations, the central body further includes an opening directed to the bore sufficient to determine the presence of a drill bit.

In some configurations, the tool further includes a sensor configured to determine the reaching of the second orientation by the lower component.

In some such configurations, the sensor comprises an LVDT sensor.

In another aspect of the disclosure, the disclosure comprises a drill system having an upper drill tool and a lower drill tool. In such a configuration, the upper drill tool comprises a central chuck, an upper component, a lower component and a coupling assembly. The upper chuck has a chuck base and at least one chuck. The at least one chuck is structurally configured to retain a drill bit. The upper component is coupled to the central chuck. The upper component has a lower stop surface. The lower component has a central body and an outer ring. The central body has an outer surface. The outer surface has threads disposed thereon. The central body further has a drill bit bore corresponding to each of the at least one chuck, to facilitate the passage of the drill bit therethrough. The bore terminates at a lower end of the central body. The outer ring has an inner surface which has outer ring threads positioned thereon. The outer ring threads matingly engage the threads of the central body. The outer ring has an upper stop interfaceable with the lower stop surface of the upper component. The coupling assembly has a slidable coupling having a first end attached to the lower component and a second end attached to one of the central chuck and the upper component. The slidable coupling facilitates the slidable movement of the lower component from a first orientation wherein the upper stop is spaced apart from the lower stop surface and a second orientation wherein the upper stop is in abutting engagement with the lower stop surface. The first orientation and the second orientation defining a stroke. The lower drill portion comprises a lower base, an upper portion and a sensor. The upper portion is slidably mounted to the lower base. The upper portion has a part receiving surface. The sensor is configured to sense relative slidable movement between the lower base and the upper portion.

In some configurations, the sensor comprises an LVDT sensor mounted between the lower base and the upper portion.

In yet another aspect of the disclosure, the disclosure is directed to a method of adjusting the depth to which a drill bit extends comprising the steps of: providing the upper drill tool; coupling a drill bit to the at least one chuck; and rotating the outer ring relative to the central body in one of a first direction and a second direction. In such a configuration, the drill tool may comprise a central chuck, an upper component, a lower component and a coupling assembly. The upper chuck has a chuck base and at least one chuck. The at least one chuck is structurally configured to retain a drill bit. The upper component is coupled to the central chuck. The upper component has a lower stop surface. The lower component has a central body and an outer ring. The central body has an outer surface. The outer surface has threads disposed thereon. The central body further has a drill bit bore corresponding to each of the at least one chuck, to facilitate the passage of the drill bit therethrough. The bore terminates at a lower end of the central body. The outer ring has an inner surface which has outer ring threads positioned thereon. The outer ring threads matingly engage the threads of the central body. The outer ring has an upper stop interfaceable with the lower stop surface of the upper component. The coupling assembly has a slidable coupling having a first end attached to the lower component and a second end attached to one of the central chuck and the upper component. The slidable coupling facilitates the slidable movement of the lower component from a first orientation wherein the upper stop is spaced apart from the lower stop surface and a second orientation wherein the upper stop is in abutting engagement with the lower stop surface. The first orientation and the second orientation defining a stroke.

In some configurations of the method, the method may further comprise the step of sensing when the second orientation has been reached.

In some configurations of the method, the at least one chuck comprises at least two chucks and the method further includes the step of coupling at least one drill bit to each of the at least two chucks.

In some configurations of the method, the step of providing further comprises the step of providing a lower drill tool in operable alignment with the upper drill tool.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
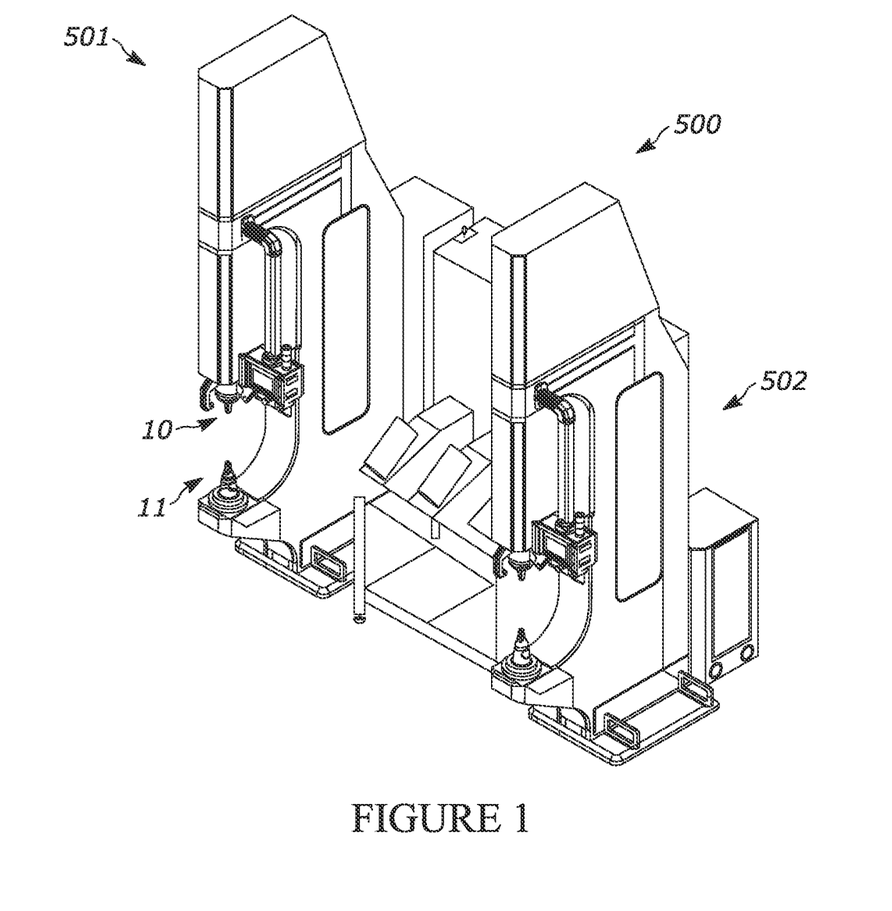
FIG. 1 of the drawings is a perspective view of the system having a drill portion and a fill portion.
Figure 2:
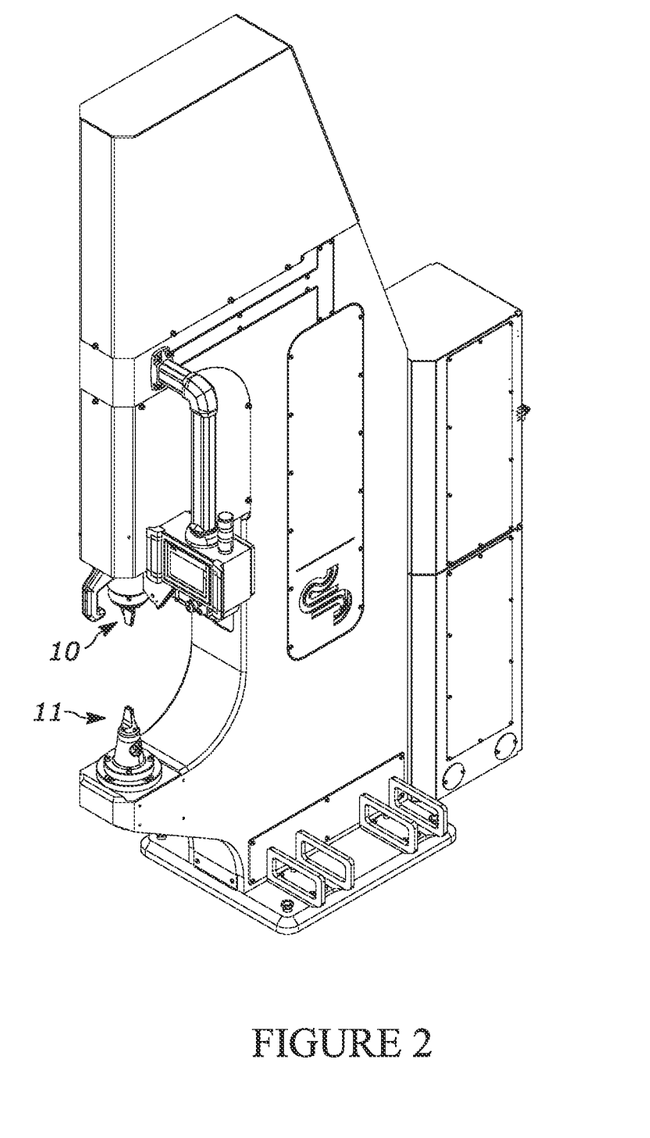
FIG. 2 of the drawings is a drill portion having the upper drill tool and lower drill tool of the present disclosure.
Figure 3A:
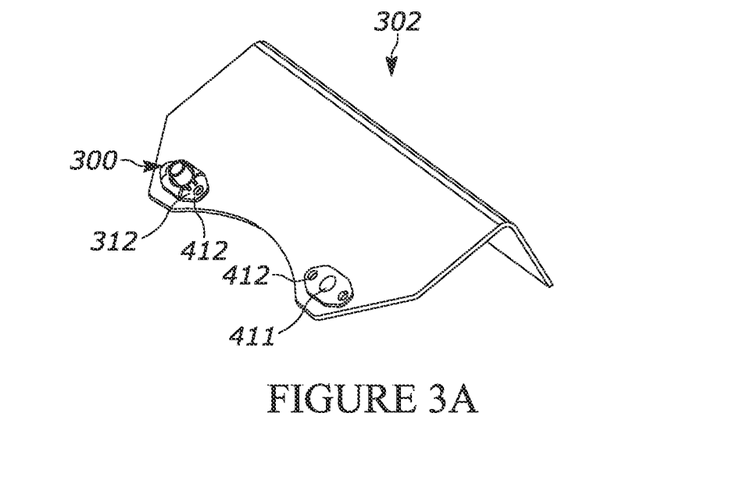
FIG. 3A of the drawings is a perspective view of a bracket having a hardware coupled thereto with a fastener.

Referring now to the drawings and in particular to FIGS. 1 and 2, the upper drill tool is shown generally at 10. In one application, the drill tool is configured to drill openings through a bracket, such as bracket 302 (FIG. 3A), while other uses are contemplated. In such a use, the upper drill tool 10 can be used in association with a lower drill tool, such as lower drill tool 11. With reference to FIG. 1, the upper and lower drill tool may be utilized in a larger system 500 which is configured with a drill portion 501 and a fill portion (i.e., riveting or joining portion) 502. The drill portion, also referred to as a drill system, generally provides for an upper portion to which the upper drill tool is coupled and moved vertically up and down toward and away from the lower drill tool. The upper portion may include motors and/or servos that can energize the chuck(s) (as will be described below) that are retaining the drill bit(s). The upper drill tool is not limited to use therewith.

Figure 3B:
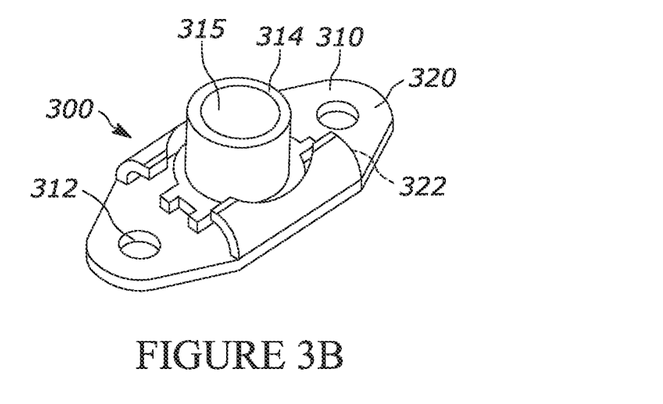
FIG. 3B of the drawings is a perspective view of the hardware shown in FIG. 3A.
Figure 3C:
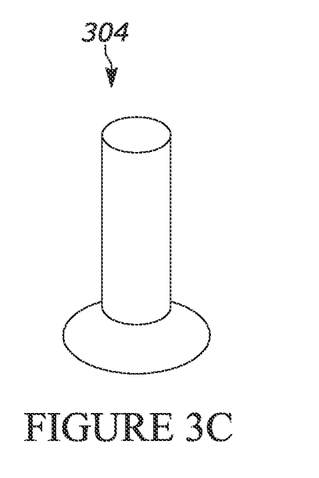
FIG. 3C of the drawings is a perspective view of a rivet utilized to couple the hardware to the bracket.
Figure 4:
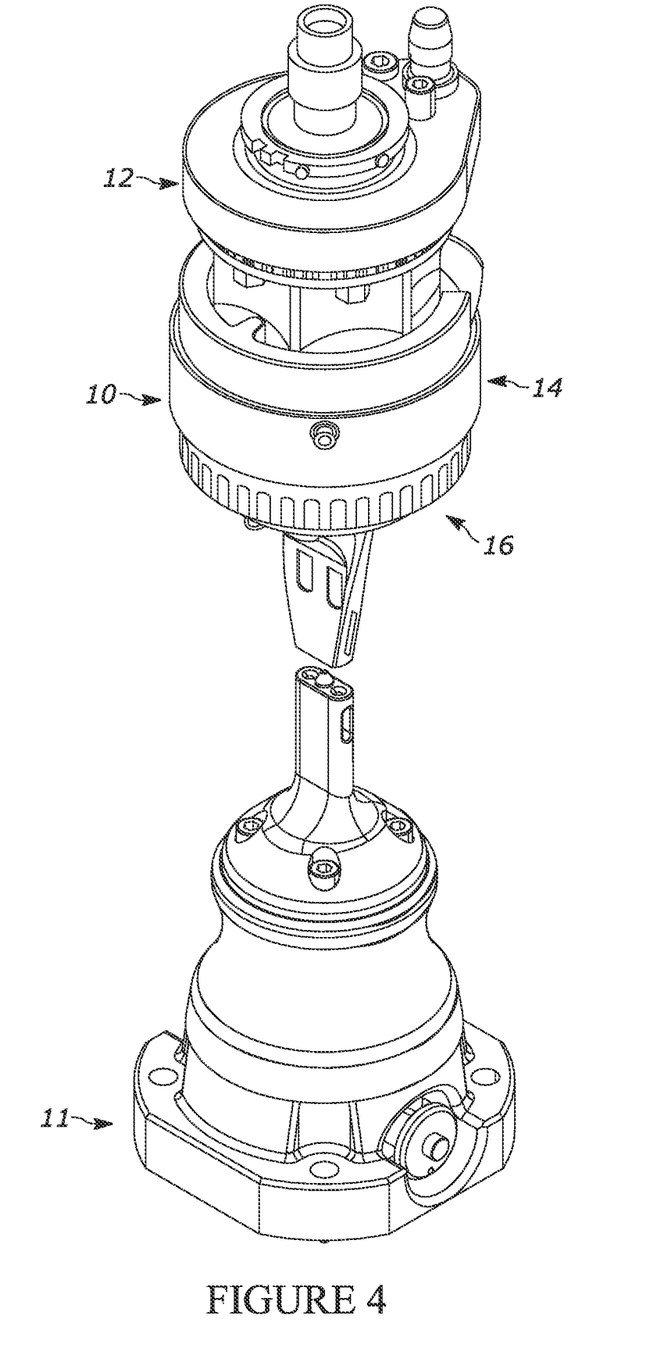
FIG. 4 of the drawings is perspective view of the upper drill tool and lower drill tool of the present disclosure.

In one instance, the upper drill tool is utilized in association with the preparation of openings in a bracket that can be utilized in the formation of structures utilized in aircraft structures. For example, these brackets (i.e., structural members such as beams or the like) can have hardware, such as hardware 300 (FIG. 3B), fastened to the bracket 302 utilizing rivets such as rivet 304 (FIG. 3C). The fastener hardware typically includes a base flange 310 having an upper surface 320 and a lower surface 322. A centrally located cylinder 314 extends from the upper surface 320 of the of the base flange and includes bore 315 extending therethrough. A pair of opposing rivet openings 312 are disposed on opposing sides of the centrally located cylinder. The bracket is coupled to fastener hardware which corresponding openings 412 and bore by extending rivets through the openings 312, 412 to couple the same together. To locate the openings, the bracket typically includes central opening 411 about which the openings for the rivets are drilled. It will be understood that a number of different configurations exist for the fastener hardware and the brackets. Additionally, it will be understood that the particular assembly of the present disclosure is not limited for use in association with such brackets, hardware or rivets.

The upper drill tool is not limited to use in association with the aviation industry, or in association with the drilling of openings through brackets, much less brackets of the type shown at bracket 302. The foregoing are meant to be exemplary and not limiting.

The upper drill tool 10 is shown, in greater detail, in FIGS. 4 through 8 as comprising, central chuck 12, upper component 14, lower component 16, and coupling assembly 18. The upper drill tool can be mounted to a movable structure such that the upper drill tool can be raised and lowered relative to a lower drill tool (FIG. 9) which may be fixed or movable). In the configuration shown in FIGS. 4 through 6 in greater detail, the upper drill tool can move linearly upwardly and downwardly toward and away from a lower drill tool 11.

Figure 9:
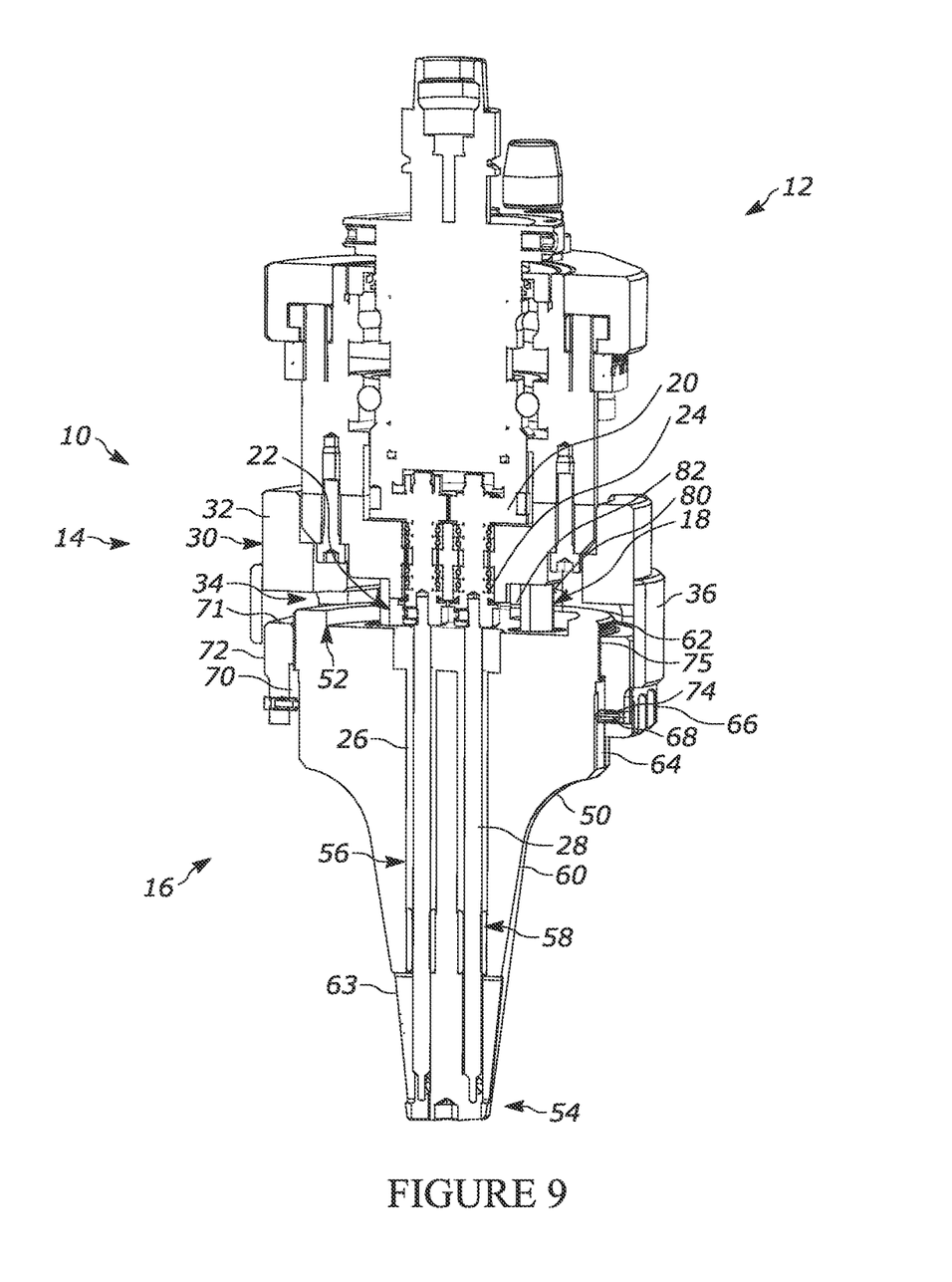
FIG. 9 of the drawings is a perspective cross-sectional view of the upper drill tool of the present disclosure, showing the drill tool in the first orientation (or away from the second orientation)
Figure 10:
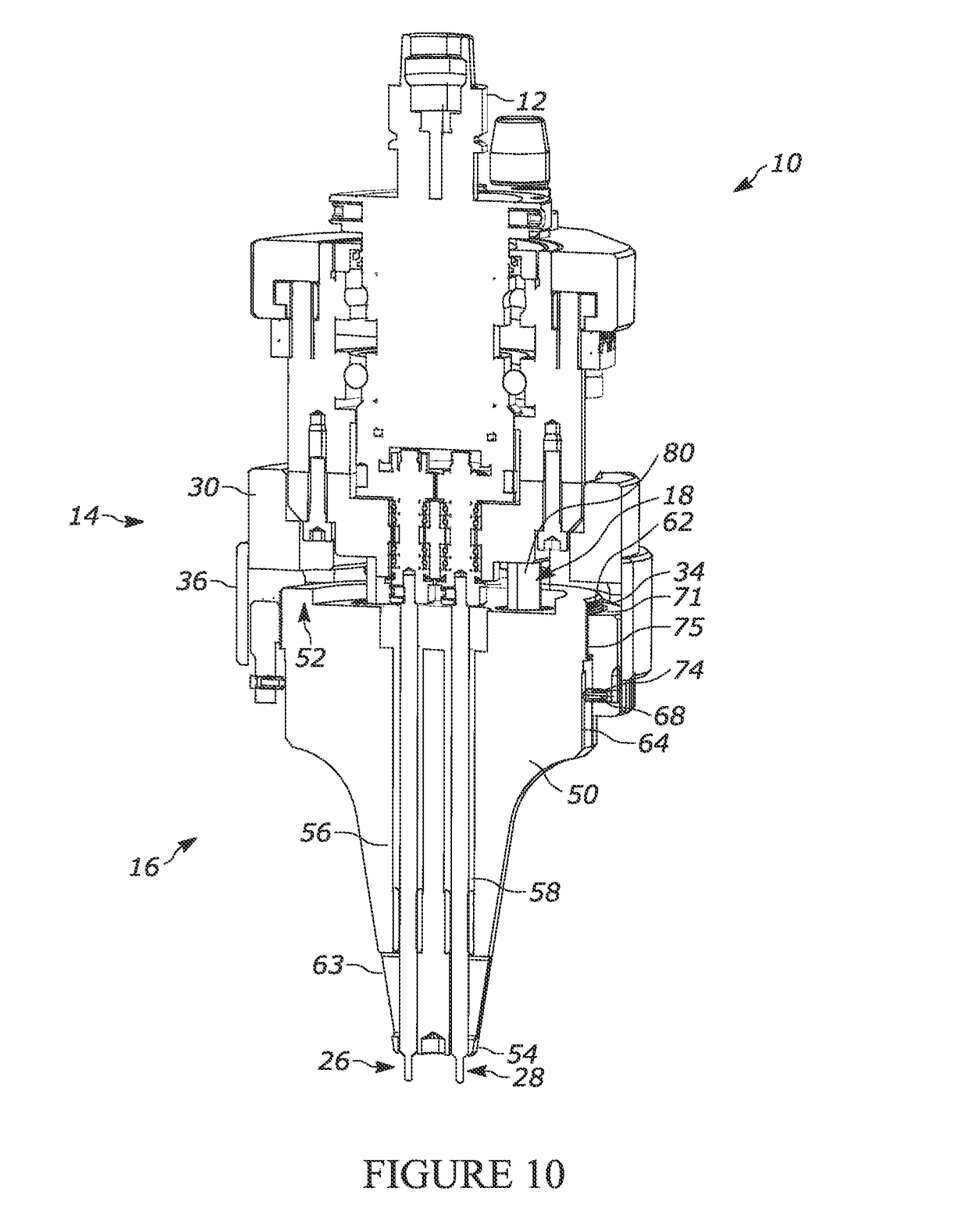
FIG. 10 of the drawings is a perspective cross-sectional view of the upper drill tool of the present disclosure, showing the drill tool in the second orientation.
Figure 11:
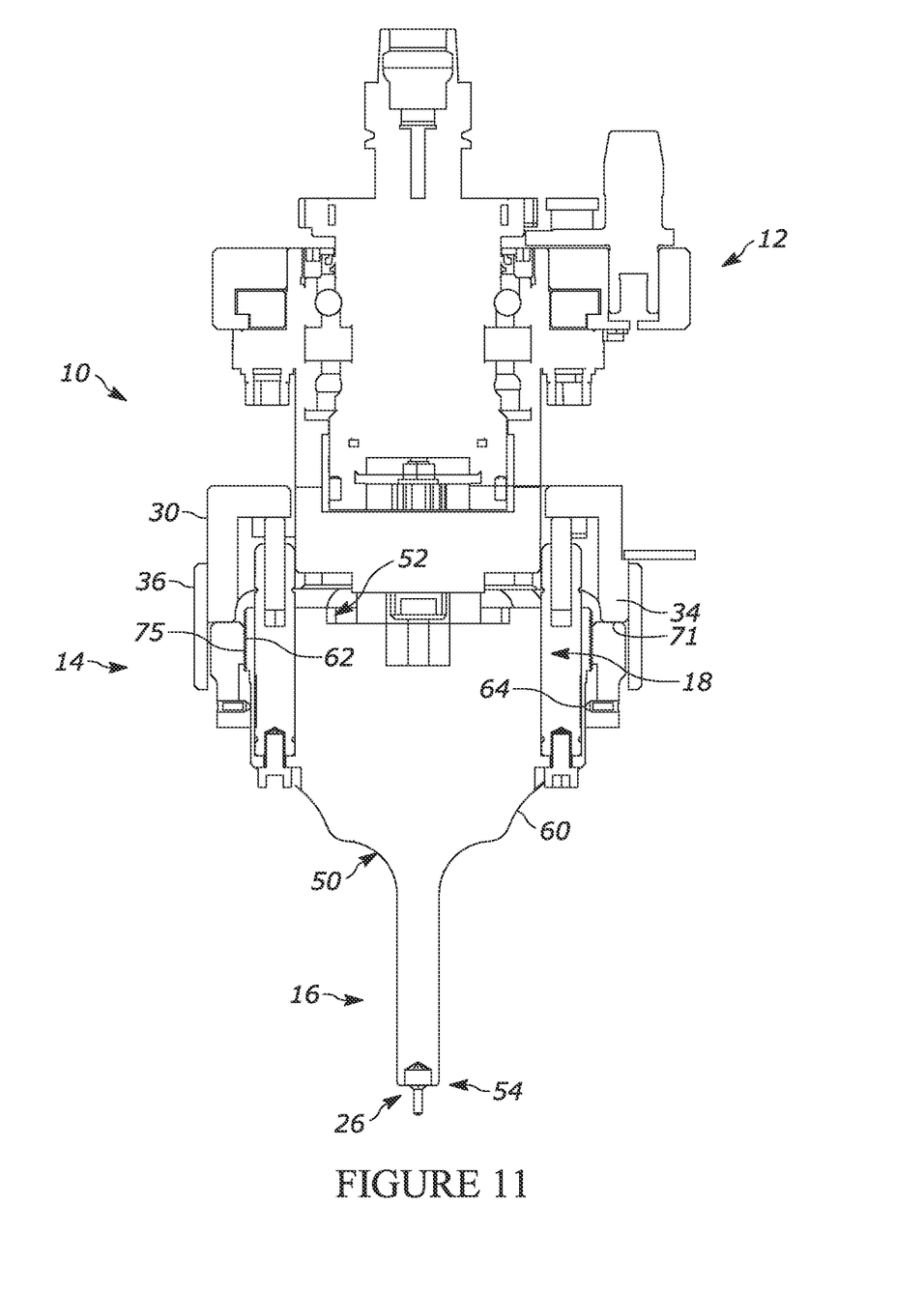
FIG. 11 of the drawings is a cross-sectional view of the upper drill tool of the present disclosure, showing the drill tool in the second orientation.

The central chuck 12, in the configuration shown in FIGS. 9 through 11, includes a chuck base 20 and a plurality of chucks that are configured to retain multiple chucks to hold a drill bit in each. In the configuration shown, a total of two side by side, spaced apart chucks are disclosed, namely first chuck 22 and second chuck 24 (that may be gear driven from a single powered shaft, for example). A first drill bit 26 is attached to (or attachable to) the first chuck 22. Similarly, a second drill bit 28 is attached to (or attachable to) the second chuck 24. It will be understood that the two chucks can rotate in unison (in the same or opposite direction) and that the chucks can be raised and lowered together with the entirety of the upper drill tool attached to a movable structure. The drill bits include a distal end which may comprise a drill bit having a countersink so as to form an opening with a chamfer or a counter sink. Other drill bits are contemplated for use, however, the disclosure is particularly useful for the drilling of openings that include a countersink or chamfered opening.

The upper component 14 is shown as comprising outer surround 30. The outer surround 30 is mounted to the central chuck 20 and generally surrounds the first and second chucks 22, 24. In the configuration shown, the upper component generally comprises a hoop-like cylindrical configuration. The outer surround 30 includes outer surface 32 that terminates at a lower stop surface 34. An outer shroud 36 depends from the outer surface of the outer surround and extends beyond the lower stop surface 34.

The lower component includes central body 50, outer ring 66 and locking tab 68. The central body 50 includes upper end 52, lower end 54, first drill bore 56, second drill bore 58 and outer surface 60. The drill bores extend from the upper end and terminate at the lower end and are aligned with the first and second chucks 22, 24 so as to allow the drill bits 26, 28 to extend therethrough and to be rotatable therewithin. Toward the lower end, opposing side slots 63 provide access to the lower end of the bores. Lubricant or other fluids can be directed into these slots so as to provide lubrication during the drilling process. Additionally, rear openings 65 (FIG. 8) may be present that provide a visual confirmation of the presence or absence of a drill bit, or the position of the drill bit. Such visual inspection can be made by a user manually, or thorough automated equipment.

The outer surface further includes threads 62 that extend about the central body toward the upper end 52 thereof. Additionally, a plurality of vertical channels or slots 64 a are disposed at predetermined spaced intervals along the outer surface 60 of the central body, such that the threads are preferably positioned between the upper ends of the slots and the upper end 52 of the central body.

Outer ring 66 extends about the central body 60 proximate the upper end 52. The outer ring 66 includes inner surface 70, upper stop 71, outer surface 72 and bores, such as bore 74. The outer ring is configured so as to be able to nest within the outer shroud 36 of the outer surround 30. The upper stop 71 is configured to align with the lower stop surface 34 of the outer surround 30. Threads 75 are disposed on the inner surface 70 which matingly engage with the threads 62 of the outer surface of the central body. The bores extend axially through the outer ring at predetermined arcuate positions in a spaced apart orientation about the outer ring. Grasping channels or surfaces are disposed along the outer surface so as to facilitate grasping and retention of the same by the user.

A plurality of axially slidable, and inwardly biased, locking tabs 68 extend through the bores 74 so as to interface with the vertical channels 64 of the outer of the central body 50. It will be understood that the interface between the locking tabs 68 and the vertical channels 64 releasably secure the outer ring to the central body and preclude relative rotation therebetween. A user can overcome the biasing of the locking tabs and rotate the outer ring relative to the central body to translate one relative to the other about the interaction between threads 62 and threads 75. Relative movement in one direction traverses the outer ring along the central body in a first direction whereas relative movement in an opposite direction traverses the outer ring along the central body in a second direction.

The coupling assembly 18 is structurally configured to facilitate the slidable upward and downward movement of the lower component 16 relative to the upper component 14. In the configuration shown, the coupling assembly 18 includes slidable couplings, such as slidable couplings 80 and biasing members 82 which are configured to bias the lower component 16 away from the upper component 14. In the configuration shown, a total of four slidable couplings are provided, and a pair of gas elements to provide the downward biasing. These slidable couplings allow for vertical movement while precluding side to side movement or rotational movement relative to the chuck base.

Figure 5:
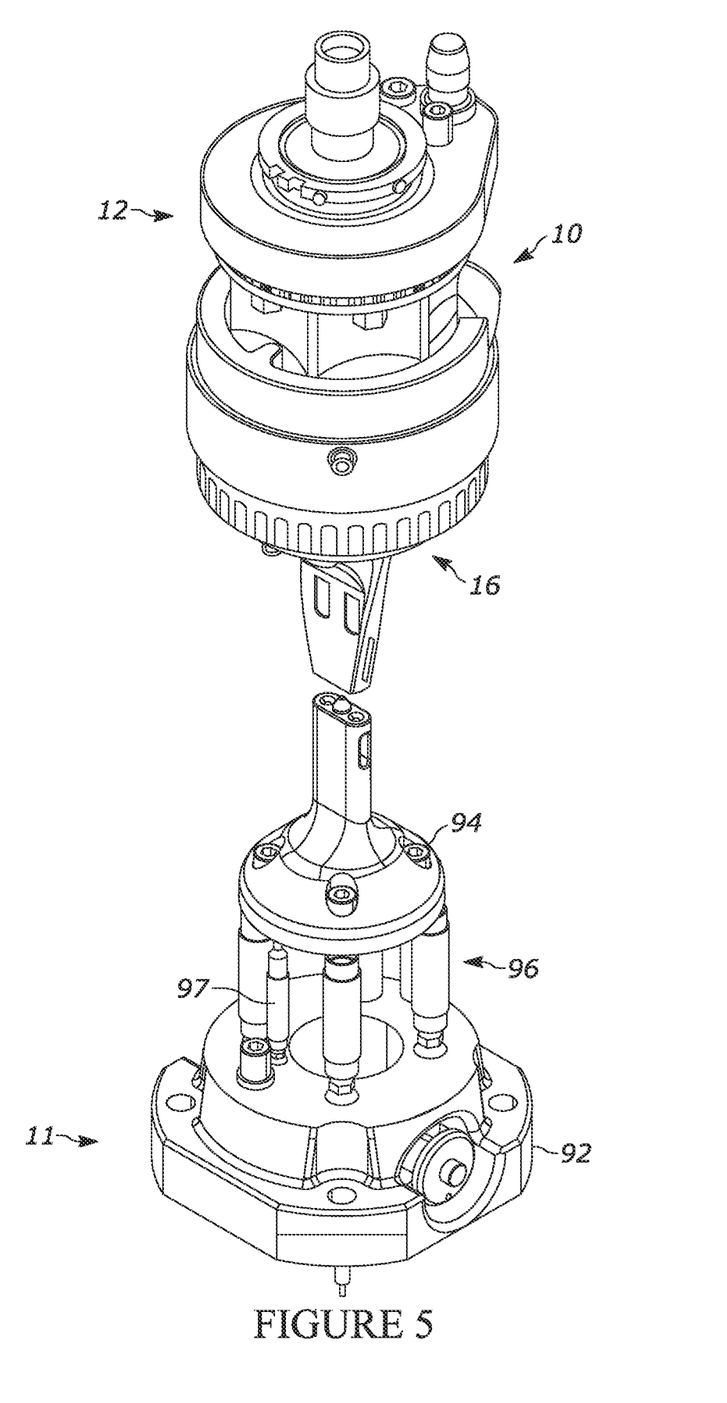
FIG. 5 of the drawings is a perspective view of the upper drill tool and lower drill tool of the present disclosure with the housing cover removed from a portion of the lower drill tool.
Figure 6:
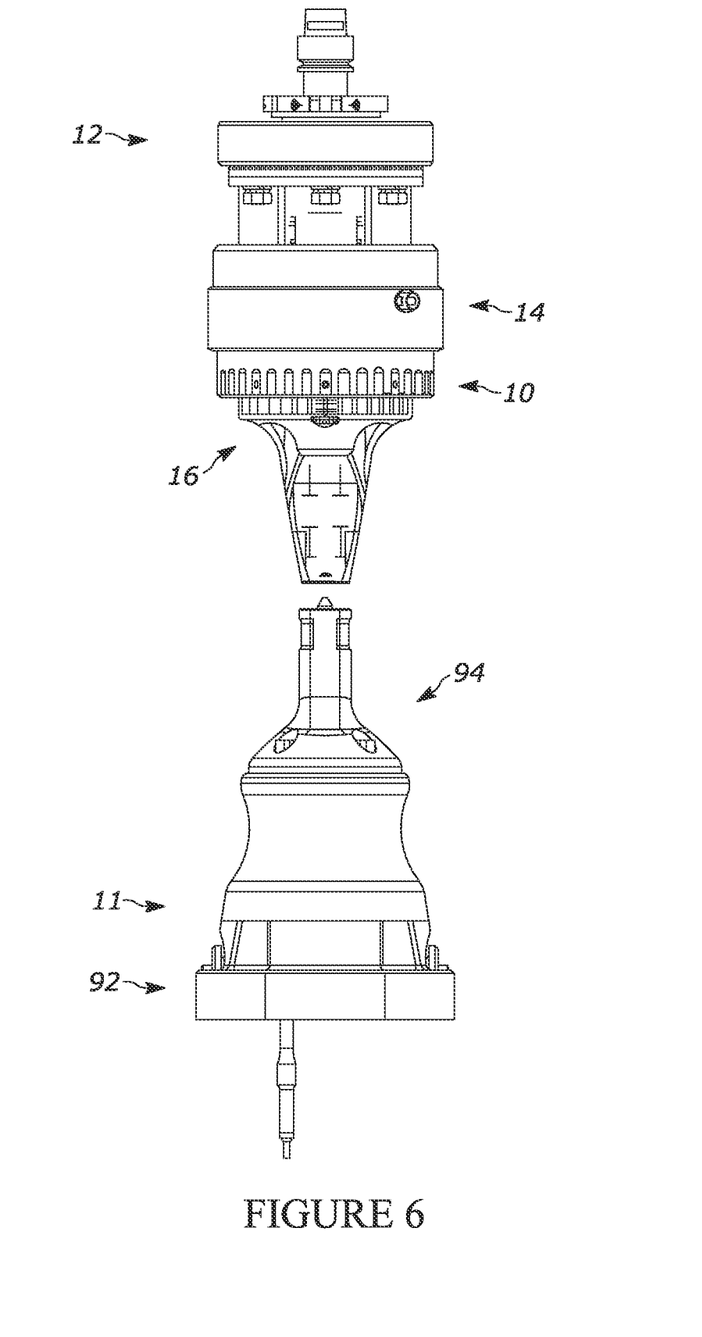
FIG. 6 of the drawings is a front elevational view of the upper drill tool and lower drill tool.
Figure 7:
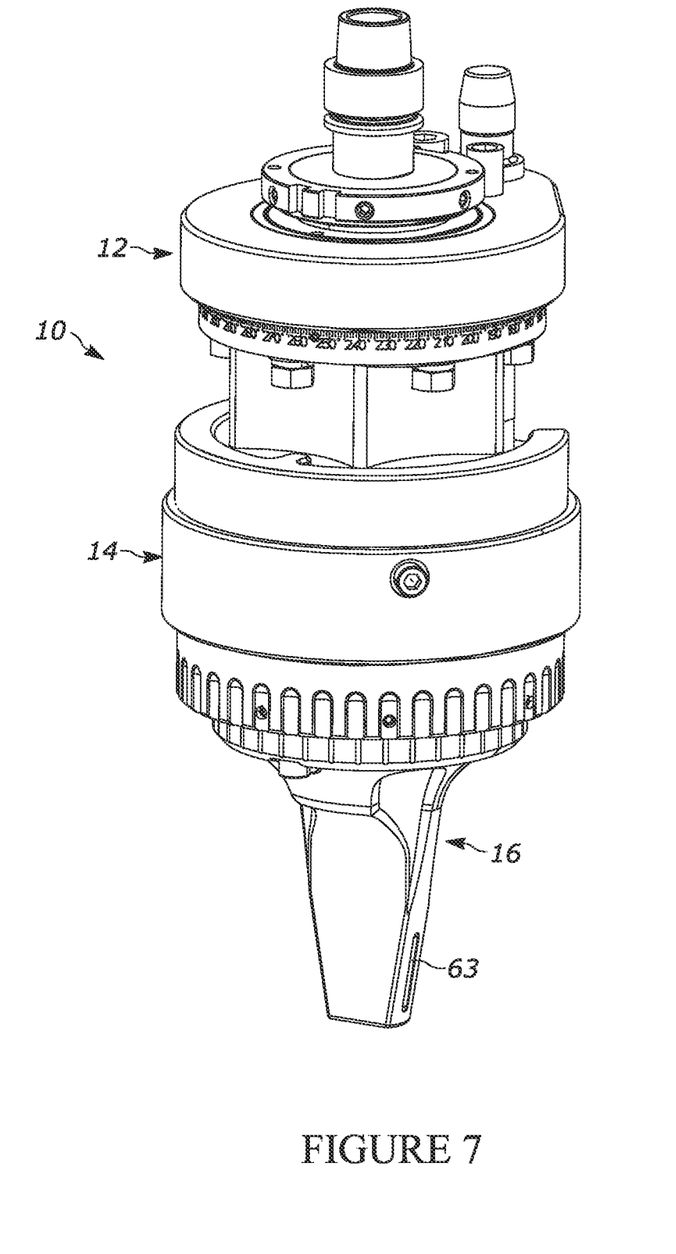
FIG. 7 of the drawings is a front perspective view of the upper drill tool of the present disclosure.
Figure 8:
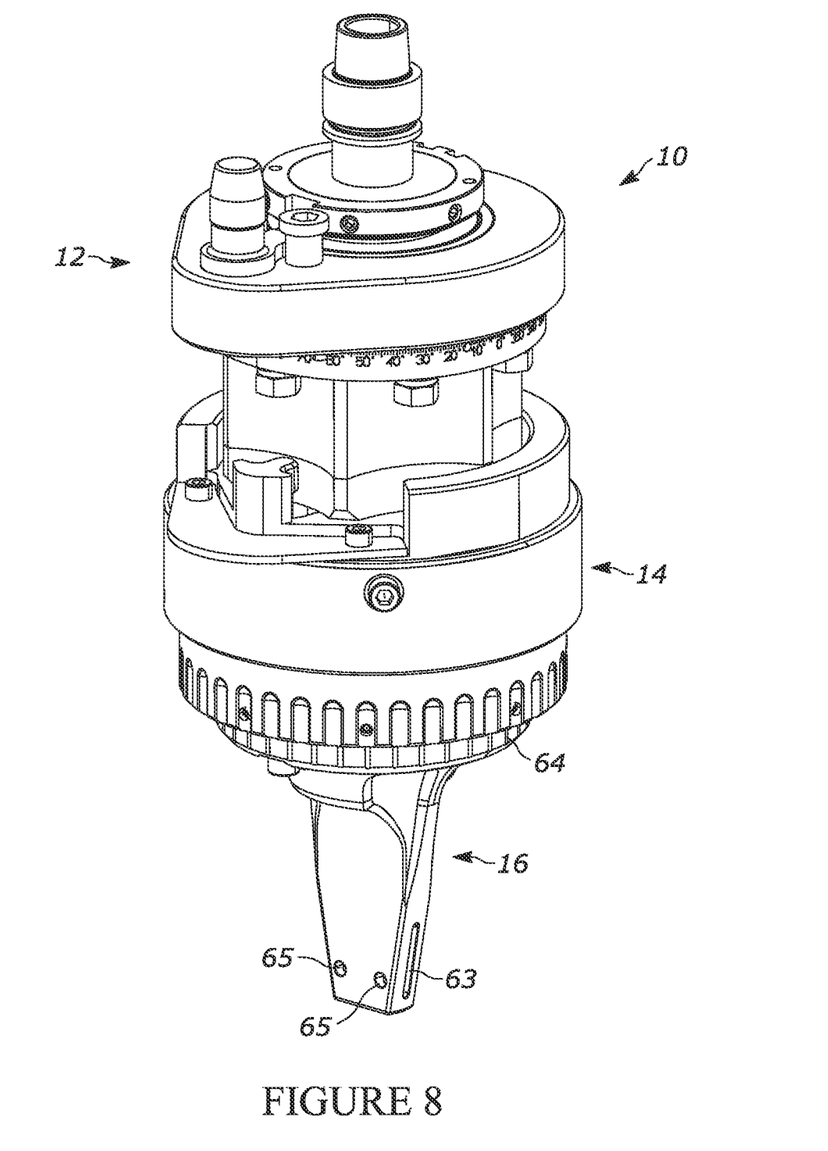
FIG. 8 of the drawings is a back perspective view of the upper drill tool of the present disclosure.

With reference to FIG. 5, the lower drill tool is shown generally at 11 as being in alignment with the upper drill tool. The lower drill tool includes lower base 92 and upper portion 94. The upper portion 94 is slidably mounted to the lower base 92, and terminates at a part receiving surface. A lower biasing member 96 biases the upper portion 94 away from the lower base 92. The lower biasing member 96 directs a stronger biasing force of the upper portion 94 away from the lower base 92 than the force exerted by the biasing member 82 directing the lower component 16 away from the upper component 14. A sensor 97 (such as, for example) an LVDT, among other sensors is positioned within the lower drill tool to sense downward movement of the upper portion 94 against the lower base 92. As will be explained, such movement indicates that the lower component has bottomed out against the upper component 14 and that the drill bits have completed drilling.

In operation, the user first attaches the correct desired drill bits to the first chuck and the second chuck. In many aircraft applications, wherein fastener hardware is attached to a bracket with rivets, the openings formed in the bracket by the drill bits are chamfered or countersunk openings. And, the shape and depth of the countersink is dimensionally significant, having very tight tolerances. As such, the depth at which the drill bit extends through the bracket becomes a very tightly controlled operation to achieve such tolerances.

Once the drill bits are provided and the entire upper drill tool is attached to the press (FIG. 2), the user can determine the travel of the lower component 16 relative to the upper component 14 which determines the amount of the drill bits that extend beyond the lower end of the central body of the lower component, and, in turn, the interaction of the drill bit with the bracket. As the drill bits are longitudinally fixed to the chuck base and the upper component, as the lower component is directed toward the upper component, the lower end of the drill bits is directed toward the lower end of the central body of the lower component, and eventually beyond the lower end of the central body.

With reference to FIGS. 9 through 11, the movement of the lower component stops relative to the upper component when the upper stop 71 of the lower component contacts the lower stop surface 34 of the upper component. This defines the upper range of movement of the upper component relative to the lower component (i.e., the stroke). This, in turn, defines the depth of the drill bit (i.e., the amount of the drill bit that extends beyond the lower end of the central body of the lower component).

To adjust the amount of the protrusion of the drill bit beyond the lower end of the central body of the lower component, the user can rotate the outer ring relative to the central body. As noted above, rotating in a first direction adjusts the ring toward the upper end of the central body, and thereby, shortening the stroke of the lower component. A shorter stroke exposes less of the drill bits (and decreases the depth of the chamfer, on bits forming a chamfer). On the other hand, rotating the outer ring relative to the central body in a second direction (opposite of the first direction) directs the ring away from the top end of the central body, and thereby, increasing or lengthening the stroke of the lower component (and increasing the depth of the chamber, on bits forming a chamfer).

To facilitate controlled movement of the central body relative to the outer ring, as the user starts to apply force to rotate the outer ring relative to the central body, the user must first overcome the force of the locking tab against the vertical channels. The movement force directs the locking tabs to retract (overcoming the inward axial bias thereof) from within the respective vertical channels. Once the locking tabs have been pushed outwardly, further application of force will allow the ring to be rotated relative to the central body (which is precluded from rotation relative to the central chuck). The user can proceed through successive engagements and disengagements (i.e., interfaces) between the locking tabs with respective ones of the vertical channels until the desired stroke is reached (that is, the desired depth of protrusion of the drill bits beyond the lower end of the central body). In the configuration shown, the movement of a locking tab from a vertical channel to an adjacent vertical channel represents a change in the protrusion of the drill bits beyond the central body of one thousandth of an inch (with the understanding that it is a greater protrusion when relatively rotated in a first direction, and a lesser protrusion when relatively rotated in a second direction). Of course, the incremental rotations may adjust the stroke by more or less than one thousandth of an inch, and different increments are contemplated, both larger and smaller.

Once the desired stroke (i.e., distance that the drill bits extend beyond the lower end of the central body) has been set, the user is ready to drill and form openings in a bracket. Initially, the upper tool 10 is directed in a downward direction toward the bracket which is positioned on the lower tool 11. Eventually, the bracket is reached and further movement of the lower component ceases while the upper component and the central chuck are permitted to continue moving in a downward direction. This continued movement eventually introduces the distal ends of the drill bits (which are spinning) to the bracket and the further movement forms the openings in the bracket. With reference to FIGS. 10 and 11, eventually, the upper stop 71 of the outer ring reaches and contacts the lower stop surface 34 of the outer surround 30. The drill bit is precluded from extending further beyond the lower end of the central body, and the openings have been completed (the end of the stroke has been reached).

Referring again to the configuration of the two tools in FIG. 5, any continued movement downward by the upper drill tool relative to the lower drill tool overcomes the lower biasing member 96 and the upper portion 94 of the lower tool begins to move relative to the lower base 92. The sensor senses this movement and directs the upper drill tool to stop moving in a downward direction. The upper drill tool can then retract completing the drilling of the openings.

In other configurations, the lower drill tool may be stationary, and the system can sense an increased current to the motors or servos that are directing the upper drill tool toward the lower drill tool. Once sensed, the upper drill tool can stop moving in the downward direction. The upper drill tool can then retract completing the drilling of the openings.

Throughout the process, lubricant can be directed through the side slots 63 (FIGS. 7 and 8) to insure proper lubrication and cooling during the drilling operation. In addition, a sensor (optical, for example) can be directed toward the rear openings 65 (FIG. 8) to ensure that the drill bits are not broken, or damaged or missing, and may be utilized to determine the condition of the drill bits.

It will be understood that the upper and lower drill tools can be releasably coupled to the overall system of the drill portion (FIG. 2) or the overall system 500 (FIG. 1) Separate upper drill tools and lower drill tools may be utilized to provide for different pitch, opening size, opening depth, drill bit spacing among other differences.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An upper drill tool comprising:
    central chuck having a chuck base and at least one chuck, the at least one chuck structurally configured to retain a drill bit;
    an upper component coupled to the central chuck, the upper component having a lower stop surface;
    a lower component having:
        a central body with an outer surface, the outer surface having threads disposed thereon, the central body having a drill bit bore corresponding to each of the at least one chuck, to facilitate the passage of the drill bit therethrough, the bore terminating at a lower end of the central body; and
        an outer ring having an inner surface, with the inner surface having outer ring threads positioned thereon, the outer ring threads matingly engaging the threads of the central body, the outer ring having an upper stop interfaceable with the lower stop surface of the upper component; and
    a coupling assembly having a slidable coupling having a first end attached to the lower component and a second end attached to one of the central chuck and the upper component, the slidable coupling facilitating the slidable movement of the lower component from a first orientation wherein the upper stop is spaced apart from the lower stop surface and a second orientation wherein the upper stop is in abutting engagement with the lower stop surface, with the first orientation and the second orientation defining a stroke,
    wherein the coupling assembly precludes rotation of the central body relative to the chuck base.

2. The upper drill tool of claim 1 wherein rotation of the outer ring relative to the central body along the outer ring threads and the threads in a first direction increases the stroke, whereas rotation of the outer ring relative to the central body in a second direction decreases the stroke.

3. The upper drill tool of claim 1 wherein the coupling assembly further comprises a biasing member directing the lower component toward the first orientation.

4. The upper drill tool of claim 1 wherein the at least one chuck comprises at least two chucks in a side by side spaced apart orientation, each of the chucks configured to retain a drill bit that is extendable through corresponding bores in the central body of the lower component.

5. The upper drill tool of claim 1 wherein the outer ring has an outer surface with a plurality of gripping channels disposed thereon, which are configured to facilitate grasping and rotation of the outer ring by a user.

6. The upper drill tool of claim 1 wherein the outer ring surrounds the central body proximate an upper end thereof.

7. The upper drill tool of claim 1 wherein the central body further includes a side slot extending to the at least one bore proximate the lower end of the central body so as to provide ingress for lubricant.

8. The upper drill tool of claim 1 wherein the central body further includes an opening directed to the bore sufficient to determine the presence of a drill bit.

9. The upper drill tool of claim 1 further comprising a sensor configured to determine the reaching of the second orientation by the lower component.

10. The upper drill tool of claim 1 wherein the sensor comprises an LVDT sensor.

11. A method of adjusting the depth to which a drill bit extends comprising the steps of:
    providing the upper drill tool of claim 1;
    coupling a drill bit to the at least one chuck; and
    rotating the outer ring relative to the central body in one of a first direction and a second direction.

12. The method of claim 11 further comprising the step of: sensing when the second orientation has been reached.

13. The method of claim 11 wherein the at least one chuck comprises at least two chucks and the method further includes the step of coupling at least one drill bit to each of the at least two chucks.

14. The method of claim 11 wherein the step of providing further comprises the step of providing a lower drill tool in operable alignment with the upper drill tool.

15. An upper drill tool comprising:
    central chuck having a chuck base and at least one chuck, the at least one chuck structurally configured to retain a drill bit;
    an upper component coupled to the central chuck, the upper component having a lower stop surface;
    a lower component having:
        a central body with an outer surface, the outer surface having threads disposed thereon, the central body having a drill bit bore corresponding to each of the at least one chuck, to facilitate the passage of the drill bit therethrough, the bore terminating at a lower end of the central body; and
        an outer ring having an inner surface, with the inner surface having outer ring threads positioned thereon, the outer ring threads matingly engaging the threads of the central body, the outer ring having an upper stop interfaceable with the lower stop surface of the upper component; and
    a coupling assembly having a slidable coupling having a first end attached to the lower component and a second end attached to one of the central chuck and the upper component, the slidable coupling facilitating the slidable movement of the lower component from a first orientation wherein the upper stop is spaced apart from the lower stop surface and a second orientation wherein the upper stop is in abutting engagement with the lower stop surface, with the first orientation and the second orientation defining a stroke,
    wherein the outer surface of the central body includes a plurality of vertical channels that are spaced apart from each other uniformly about the outer surface, with at least one locking tab extending from an inner surface of the outer ring, biased against the outer surface so as to engage at least one of the plurality of vertical channels.

16. The upper drill tool of claim 15 wherein the rotation of the lower component sufficient so as to have a locking tab move between two adjacent vertical channels alters the stroke a predetermined quantity.

17. The upper drill tool of claim 16 wherein the predetermined quantity of the altering of the stroke comprises one thousandth of an inch.

18. A drill system having an upper drill tool and a lower drill tool, wherein the upper drill tool comprises:
- central chuck having a chuck base and at least one chuck, the at least one chuck structurally configured to retain a drill bit;
- an upper component coupled to the central chuck, the upper component having a lower stop surface;
- a lower component having:
  - a central body with an outer surface, the outer surface having threads disposed thereon, the central body having a drill bit bore corresponding to each of the at least one chuck, to facilitate the passage of the drill bit therethrough, the bore terminating at a lower end of the central body; and
  - an outer ring having an inner surface, with the inner surface having outer ring threads positioned thereon, the outer ring threads matingly engaging the threads of the central body, the outer ring having an upper stop interfaceable with the lower stop surface of the upper component; and
- a coupling assembly having a slidable coupling having a first end attached to the lower component and a second end attached to one of the central chuck and the upper component, the slidable coupling facilitating the slidable movement of the lower component from a first orientation wherein the upper stop is spaced apart from the lower stop surface and a second orientation wherein the upper stop is in abutting engagement with the lower stop surface, with the first orientation and the second orientation defining a stroke,
- wherein the coupling assembly precludes rotation of the central body relative to the chuck base the lower drill portion comprises:
- a lower base;
- an upper portion slidably mounted to the lower base, the upper portion having a part receiving surface; and
- a sensor configured to sense relative slidable movement between the lower base and the upper portion.

19. The drill system of claim 18 wherein the sensor comprises an LVDT sensor mounted between the lower base and the upper portion.

\* \* \* \* \*